United States Patent Office 2,900,364
Patented Aug. 18, 1959

2,900,364

COMPOSITIONS OF MATTER AND METHODS FOR PREPARING THEM

David Wasserman, Irvington, N.J., assignor to Minnesota Mining and Manufacturing Company, St. Paul, Minn., a corporation of Delaware No Drawing. Application August 29, 1955
Serial No. 531,290

10 Claims. (Cl. 260—47)

This invention relates to novel compositions of matter and to methods for preparing them and also to articles of manufacturing including said compositions of matter as components. In one of its more specific aspects this invention is directed to certain glycidyl ether compositions which are capable of being converted to the solid state by combining hardening agents therewith.

Prior to this invention glycidyl polyether of resorcinol was known and such polyether is reactable with amines to provide reaction products infusible at 200° C. Said polyether has the disadvantage of not being soluble in the cheap aliphatic hydrocarbon solvents, such as heptane and the like and in addition such reaction products in film form lacked flexibility which often is desired. Also prior to this invention glycidyl ether of 3-pentadecyl hydroxy benzene was known. Such ether while being soluble in heptane is not capable of being reacted with an amine to provide reaction products infusible at 200° C.

According to this invention, I provide novel compositions of matter which are heptane soluble, may be of low viscosity, on the order of about 600 centipoises at 25° C. and are capable when mixed with a hardening agent of being converted to the solid state infusible at 200° C. The hardening or curing agents preferably employed are amines and polycarboxylic organic acids. By the term polycarboxylic organic acid as employed in the present description and claims, I mean either or both, such acids or anhydrides thereof. If desired other curing or hardening agents, such as strong mineral acids, as for example phosphoric, sulphuric, boron trifluoride complexes, such as the ether, phenol or acetic anhydride complexes of boron trifluoride may be employed as may be amine salts and amine complexes, such as boron trifluoride-amine complexes, etc. The novel compositions of this invention may be mixed with said curing agents, and with or without the aid of heat depending upon the curing agent used, the mix may be converted to the solid state infusible at 200° C.

The novel compositions of matter of this invention in one of its specific aspects comprise combinations or solutions, hereinafter known as C, which consist essentially of (A) one or a combination of two or more glycidyl polyethers of a dihydric mononuclear phenol having a nuclear hydrocarbon alkyl substituent of 14–28 carbon atoms, said polyethers having an epoxide equivalency greater than 1 and no greater than 2, with or without (B) glycidyl ether of 3-pentadecyl hydroxybenzene, with the ratio by weight of (A) to (B) being at least 3 parts of (A) for each 7 parts of (B) that is: (30 parts of (A) and 0–70 parts of (B)). Examples of said dihydric phenols with such substituents are 5-pentadecyl resorcinol, 3-pentadecyl catechol, 4-pentadecyl catechol, 2-pentadecyl hydroquinone, 4-heptadecyl catechol, 3-heptadecyl catechol, etc.

Such novel compositions of matter C of this invention are further characterized as follows: a mixture of a 100 gram sample thereof and 1 gram of boron trifluoride diethyl ether complex (50% boron trifluoride) after being maintained at 120° C. for 1 hour will be found to have been converted to the substantially solid state infusible at 200° C.

For certain purposes, it is preferable that the ratio by weight of (A) to (B) be at least 2 parts of (A) to 3 parts of (B), that is: (40 parts of (A) and 0–60 parts of (B)) and such combinations, hereinafter known as C–1 are further characterized as follows: a mixture of a 100 gram sample thereof and 8 grams of diethylene triamine after being maintained at 120° C. for 16 hours will be found to have been converted to the substantially solid state infusible at 200° C.

In addition, such novel compositions of matter C–1 of this invention may be reacted with an agent selected from the group consisting of amines and polycarboxylic organic acids to provide novel reaction products. The amines may be primary, secondary and tertiary aliphatic amines, aromatic amines, cyclic amines, heterocyclic amines, polyfunctional amines, etc., and specific examples of some of them are propyl amine, diethyl amine, methyl benzyl amine, aniline, naphthylamine, dimethyl aniline, cyclohexylamine, N,N diethyl cyclohexylamine, pyridine, alkyl pyridine, quinoline, N,N dimethylalpha benzylamine, ethyl morpholine, piperidine, melamine, dialkyl melamine, dicyandiamide, ethylene diamine, propylene diamine, 1,6 hexamethylene diamine, diethylene triamine, dipropylene triamine, triethylene tetramine, tetraethylene pentamine, 3-diethylaminopropylamine, etc.; the polycarboxylic organic acids may be (a) aromatic acids and anhydrides such as phthalic acid, tetraphthalic acid, phthalic anhydride, monochlorophthalic anhydride, dichlorophthalic anhydride, dihydrophthalic anhydride and tetrahydrophthalic anhydride, 1,2-naphthalic anhydride, 2,3-naphthalic anhydride; (b) alkyl dibasic carboxylic acids and anhydrides such as oxalic acid, succinic acid and anhydride, adipic, sebacic, azelaic acids and their polyanhydrides, chlormaleic anhydride, itaconic acid and its anhydride, etc. (c) maleic anhydride and its adducts which may be produced by Diels-Alder synthesis such as hexachlorocyclopentenyl succinic anhydride, tetrapropenyl succinic anhydride, dodecenyl succinic anhydride, cyclopentenyl succinc anhydride: the reaction product of maleic anhydride with eleostearic acid anhydride; the reaction product of unsaturated terpenes such as limonene, pinene, camphene with maleic anhydride. Other examples of diene adducts of maleic anhydride are 4-cyclohexene-1,2 - dicarboxylic anhydride, 1,5 - dimethyl - 2,3,4,6,7,8, hexahydronaphthalene-3,7,8-tetracarboxylic dianhydride.

While any of said dihydric mononuclear phenols having a nuclear alkyl substituent of 14–28 carbon atoms may be reacted with epichlorhydrin under alkaline conditions for the production of the glycidyl polyether thereof having an epoxide equivalency greater than 1, I shall in the following Examples A–1 and A–2 herein, set forth illustrative method for the production thereof and Example B–1 herein illustrates a method for producing the glycidyl ether of 3-pentadecyl phenol.

*Example A–1*

Preparation of the glycidyl polyether of 5-pentadecyl resorcinol.

| | grams | moles |
|---|---|---|
| (I) 5-pentadecyl resorcinol, M.P.—92–94° C. | 6,400 | 20 |
| (II) Epichlorohydrin, 97% | 11,460 | 120 |
| (III) Sodium hydroxide (50% aqueous solution) | 3,460 | 43.3 |
| (IV) Sodium hydroxide 50% (aqueous solution) | 400 | 5.0 |
| (V) Glacial acetic acid | 27 | 0.45 |
| (VI) Toluene | 3,950 | |

A 22 liter flask equipped with stirrer, addition funnel, condenser and thermometer was loaded with (II) and then (I) was added with stirring and warming to dissolve. The solution was heated to 70° C. and (III) was added slowly over a period of two hours. After the last addition of (III), the mass was held at 70° C. for one hour and then the excess (II) removed by distillation in vacuo. The last bit of (II) was recovered at 50° C. and 22 mm. pressure. Then (IV) was added to the mass now containing substantially none of (II) in the free state at 50° C. over a 45 minute period and the mix was maintained with stirring at 50° C. for 45 minutes. The resultant reaction mixture was neutralized with (V) and volatile components removed by distillation to a pot temperature of 100° C. and 0.3 mm. of mercury pressure. Then (VI) was added and 100 grams of (VI) was distilled off with the last traces of moisture. The solution was filtered through a Buchner funnel using a Dicalite filter aid bed on the filter paper. This was washed with toluene and the combined filtrate stripped of solvents in the 22 liter flask up to a pot temperature of 100° C. and 0.3 mm. of mercury pressure.

The yield was 8635 grams of glycidyl polyether of 5-pentadecyl resorcinol which was an amber liquid at 25° C. having a viscosity of 644 cps. at 25° C. and an epoxide equivalent of 315 grams, and a melting range of 19–23° C., and hereinafter known as product A–1.

*Example A–2*

|  | grams | moles |
|---|---|---|
| (I) 5-pentadecyl resorcinol | 161 | 0.5 |
| (II) Epichlorhydrin, 97% | 101.8 | 1.1 |
| (III) Sodium hydroxide (50% aqueous solution) | 98 | 1.2 |
| (IV) Methyl isobutyl ketone | 321 |  |
| (V) Hydrochloric acid, 18% | 40 | 0.2 |

Into a two liter flask equipped as in Example A, were charged (I) and (IV) and solution took place. Then (III) was added slowly with stirring. After the last addition of (III), the temperature of the mix was increased to 75° C. Then (II) was added dropwise while maintaining the temperature of the mass in the range of 75°–90° C. throughout the addition. After the last addition of (II), the mass was maintained at 85°–88° C. for 1 hour and then cooled to 25° C. The excess alkali was neutralized with (V) and the water in the mass was removed by azeotropic distillation of (IV) and the water, using a Dean-Stark water trap. The salts developed in the reaction were removed by filtration through a Buchner funnel and the filtrate was stripped of solvent up to a pot temperature of 100° C. and 1 mm. of mercury pressure. Yield of pale amber solid was 218 grams, melting point 49–54° C., epoxide equivalent 2720 and hereinafter known as product A–2.

*Example B*

Preparation of the glycidyl ether of 3-pentadecyl phenol.

|  | grams | moles |
|---|---|---|
| (I) 3-pentadecyl hydroxybenzene, M.P. 49–50° C. | 9,000 | 29.6 |
| (II) Epichlorhydrin, 97% | 5,720 | 59.8 |
| (III) Sodium hydroxide (50% aqueous solution) | 2,700 | 33.7 |
| (IV) Acetic acid (56% aqueous solution) | 10 |  |
| (V) Toluene | 5,200 |  |

The apparatus described in Example A was used to prepare the above material. Starting materials (I) and (II) were weighed into the flask and heated to 70° C. to obtain a clear solution. To this was added (III) over a period of two hours maintaining a pot temperature of 70° C. After the last addition of (III) the reaction mixture was held at 70° C. for two hours and then cooled to 30° C. The mass was neutralized with (IV) and the excess free (II) recovered by distillation at 4–10 mm. of mercury pressure. The last traces of volatile material was removed at 100° C. and 0.3 mm. of mercury pressure. One half of (V) was added and 500 grams (V) was distilled off to remove the last traces of water. The solution was filtered as in Example A and the filter bed washed with the remaining quantity of (V). The combined filtrates were stripped of solvent (V) at 4–10 mm. of mercury pressure and the last traces of solvent removed at 100° C. and 0.3 mm. of mercury pressure.

Yield of pale amber solid melting at 32–35° C. was 10,849 grams, epoxide equivalent was 545 grams and this product which was glycidyl ether of 3-pentadecyl hydroxybenzene is hereinafter known as product B–1.

The following Examples 1–9 are given by way of illustrating compositions of this invention which have been cured to the solid state infusible at 200° C.

*Example 1 (100 parts of A and 0 of B)*

One hundred grams of product A–1 and 7.7 grams of triethylene tetramine were mixed together and the mixture was cured at 120° C. for 18 hours. At the end of that period the mass was found to be a pale amber solid infusible at 200° C. and having a Shore "A" hardness of 70.

*Example 2 (2 parts of A to 3 parts of B)*

Forty grams of product A–1 and 60 grams of product B–1 were mixed with 7.7 grams of triethylene tetramine. This mixture was maintained at 120° C. for 18 hours and at the end of that period was found to be a solid infusible at 200° C. and was softer and more flexible than cured product of Example 1.

*Example 3 (100 parts of A and 0 of B)*

One hundred grams of product A–1 were mixed at 110° C. with 47 grams of phthalic anhydride and the mix cured for 18 hours at 120° C. At the end of that period the mass was found to be a solid infusible at 200° C. and having a Shore "A" hardness of 70.

*Example 4 (100 parts of A and 0 of B)*

100 grams of product A–1 were mixed with 82 grams of dodecenyl succinic anhydride and cured for 18 hours at 120° C. at the end of that period the mass was found to be a solid infusible at 200° C. and having a Shore "A" durometer hardness of 15.

*Example 5 (2 parts of A to 3 parts of B)*

40 grams of product A–1, 60 grams of product B–1, 40 grams of methyl nadic anhydride and 0.40 grams of dimethylbenzylamine were mixed together and maintained at 120° C. for 18 hours. At the end of the period the mass was found to be a rubbery solid infusible at 200° C.

*Example 6 (3 parts of A to 7 parts of B)*

30 grams of product A–1 was mixed with 1 gram of 50% BF₃-diethyl ether complex. After cooling to 25° C., 70 grams of product B–1 was added. A violent exothermic reaction took place at room temperature to yield a rubbery solid infusible at 200° C.

*Example 7 (100 parts of A and 0 of B)*

100 grams of product A–1 and 5 parts of 85% phosphoric acid after mixing and maintained at 120° C. for 5 minutes yielded a rubbery solid infusible at 200° C.

*Example 8 (100 parts of A and 0 of B)*

100 grams of product A–1 was mixed with 5 grams of boron trifluoride ethylamine complex and heated at 160° C. for 30 minutes. An amber solid infusible at 200° C. was obtained.

*Example 9 (100 parts of A and 0 of B)*

100 parts of product A–2 and 3 parts of triethylene tetramine were mixed to clear solution. The solution was maintained at 110° C. for 2 hours after which time it was found to be a solid infusible at 200° C.

The compositions of this invention can be used as casting resins and encapsulating resins for electrical components, and other objects to be protected from moisture or other deleterious substances. They may be used as a 100% solids varnish, for impregnation of voids in electrical motors or coating cloth, mat or paper. The solubility of these compositions in heptane and other cheap paraffinic hydrocarbons enables them to be used as coatings, in conjunction with suitable curing agents, for paper, cotton, glass, nylon, Orlon, Dacron, wool, asbestos and other fibrous materials in the form of sheets, mat or cloth. They can be used as laminating resins to bond several layers of cloth, paper or foil together to form reinforced plastic objects.

It is to be understood, of course, that in place of the glycidyl polyether of 5-pentadecyl resorcinol, there may be substituted in whole or in part, the glycidyl polyether of one or more of the dihydric mononuclear phenols having nuclear substituted alkyl hydrocarbon of 14–28 carbon atoms, examples of which have been hereinbefore set forth.

I claim:

1. A novel composition of matter comprising glycidyl polyether of dihydric mononuclear phenol having nuclear alkyl hydrocarbon substituent of 14–28 carbon atoms, said polyether having an epoxide equivalency greater than 1, said composition of matter characterized as follows: a mixture of a 100 gram sample thereof and 1 gram of boron trifluoride ether complex (50% boron trifluoride) after being maintained at 120° C. for 1 hour will have been converted to the solid state infusible at 200° C.

2. A novel composition of matter comprising glycidyl polyether of dihydric mononuclear phenol having nuclear hydrocarbon alkyl substituent of 14–28 carbon atoms, said polyether having an epoxide equivalency greater than 1, said composition of matter characterized as follows: a mixture of a 100 gram sample thereof and 8 grams of diethylene triamine after being maintained at 120° C. for 16 hours will have been converted to the substantially solid state and infusible at 200° C.

3. A novel composition of matter comprising glycidyl polyether of pentadecyl resorcinol, said polyether having an epoxide equivalency greater than 1, said composition of matter characterized as follows: a mixture of a 100 gram sample thereof and 8 grams of diethylene triamine after being maintained at 120° C. for 16 hours will have been converted to the substantially solid state and infusible at 200° C.

4. A novel composition of matter comprising glycidyl polyether of 5-pentadecyl resorcinol, said polyether having an epoxide equivalency greater than 1, said composition of matter characterized as follows: a mixture of a 100 gram sample thereof and 8 grams of diethylene triamine after being maintained at 120° C. for 16 hours will have been converted to the substantially solid state and infusible at 200° C.

5. A novel composition of matter comprising (A) glycidyl polyether of dihydric mononuclear phenol having nuclear hydrocarbon alkyl substituent of 14–28 carbon atoms and (B) glycidyl ether of pentadecyl hydroxybenzene the ratio by weight of (A) to (B) being at least 2 parts of (A) for each of 3 parts of (B), said polyether having an epoxide equivalency greater than 1, said composition of matter characterized as follows: a mixture of 100 gram sample thereof and 8 grams of diethylenetriamine after being maintained at 120° C. for 16 hours will have been converted to the substantially solid state and infusible at 200° C.

6. A novel composition of matter comprising, (A) glycidyl polyether of pentadecyl resorcinol and (B) glycidyl ether of pentadecyl hydroxybenzene, the ratio by weight of (A) to (B) being at least 2 parts of (A) for each of 3 parts of (B) said polyether having an epoxide equivalency greater than 1, said composition of matter characterized as follows: a mixture of a 100 gram sample thereof and 8 grams of diethylenetriamine after being maintained at 120° C. for 16 hours will have been converted to the substantially solid state and infusible at 200° F.

7. A novel composition of matter comprising, (A) glycidyl ether of 5-pentadecyl resorcinol and (B) glycidyl ether of pentadecyl hydroxybenzene, the ratio by weight of (A) to (B) being at least 2 parts of (A) for each of 3 parts of (B), said polyether having an epoxide equivalency greater than 1, said composition of matter characterized as follows: a mixture of a 100 gram sample thereof and 8 grams of diethylenetriamine after being maintained at 120° C. for 16 hours will have been converted to the substantially solid state and infusible at 200° C.

8. A composition of matter defined in claim 1 and a curing agent therefor converted to the substantially solid state and infusible at 200° C. said curing agent selected from the group consisting of amines and acids.

9. A novel composition of matter consisting essentially of (a) glycidyl polyether of dihydric mononuclear phenol having nuclear alkyl hydrocarbon substituent of 14–28 carbon atoms, said polyether having an epoxide equivalency greater than 1, and (b) glycidyl ether of pentadecyl hydroxy benzene, with the ratio by weight of (b) to (a) being no greater than 7–3, said composition of matter characterized as follows: a mixture of a 100 gram sample thereof and 1 gram of boron trifluoride ether complex (50% boron trifluoride) after being maintained at 120° C. for 1 hour will have been converted to the solid state infusible at 200° C.

10. A composition of matter consisting essentially of (a) glycidyl polyether of dihydric mononuclear phenol having nuclear hydrocarbon alkyl substituent of 14–28 carbon atoms and (b) glycidyl ether of pentadecyl hydroxybenzene, said polyether having an epoxide equivalency greater than 1, with the ratio by weight of (b) to (a) being no greater than 60 to 40, said composition of matter characterized as follows: a mixture of a 100 gram sample thereof and 8 grams of diethylene triamine after being maintained at 120° C. for 16 hours will have been converted to the substantially solid state and infusible at 200° C.

References Cited in the file of this patent

UNITED STATES PATENTS

| | | |
|---|---|---|
| 2,665,266 | Wasserman | Jan. 5, 1954 |
| 2,735,829 | Wiles et al. | Feb. 21, 1956 |